United States Patent
Hallström

(10) Patent No.: US 8,085,988 B2
(45) Date of Patent: Dec. 27, 2011

(54) APPARATUS AND METHOD FOR RECOGNIZING AND DETERMINING A POSITION

(75) Inventor: Anders Hallström, Handen (SE)

(73) Assignee: DeLaval Holding AB, Tumba (SE)

( * ) Notice: Subject to any disclaimer, the term of this patent is extended or adjusted under 35 U.S.C. 154(b) by 0 days.

(21) Appl. No.: 12/980,474

(22) Filed: Dec. 29, 2010

(65) Prior Publication Data

US 2011/0090336 A1    Apr. 21, 2011

Related U.S. Application Data

(63) Continuation of application No. 11/826,198, filed on Jul. 12, 2007.

(30) Foreign Application Priority Data

Jul. 13, 2006   (SE) ..................................... 0601556

(51) Int. Cl.
*G06K 9/00*   (2006.01)

(52) U.S. Cl. .................. 382/110; 119/14.01; 119/14.02; 119/14.03; 119/14.04; 119/14.55; 600/407; 600/453; 250/338.1; 250/363.04

(58) Field of Classification Search .... 119/14.01–14.55; 382/100, 110; 600/407, 453; 250/338.1, 250/363.04

See application file for complete search history.

(56) References Cited

U.S. PATENT DOCUMENTS

| | | | | |
|---|---|---|---|---|
| 5,020,477 | A * | 6/1991 | Dessing et al. | ............ 119/14.08 |
| 6,532,892 | B1 * | 3/2003 | Nilsson | ....................... 119/14.03 |
| 2005/0126499 | A1 * | 6/2005 | Ericsson et al. | ........... 119/14.18 |
| 2010/0199915 | A1 * | 8/2010 | Pettersson et al. | ......... 119/14.08 |

FOREIGN PATENT DOCUMENTS

| | | |
|---|---|---|
| EP | 0 975 211 | 4/2003 |
| WO | 97/15900 | 5/1997 |
| WO | 94/45808 | 10/1998 |
| WO | 00/62602 | 10/2000 |

OTHER PUBLICATIONS

International Search Report mailed Feb. 23, 2007 issued in PCT Application No. 0601556.4.

* cited by examiner

*Primary Examiner* — Atiba O Fitzpatrick
(74) *Attorney, Agent, or Firm* — Drinker Biddle & Reath LLP

(57) ABSTRACT

An apparatus for recognizing and determining the position of at least one teat of a milking animal includes a scanning head comprising a light source and a camera. The light source emits light into a region which is expected to contain a teat or teats and the camera captures images formed by the light. In a first scanning mode, the scanning head is moved from a low initial position upwards in a circular coil until the position of at least a first teat has been established. Thereafter, in a second scanning mode, the scanning head is moved upwards in a to circular coil until the positions of all teats have been established, or a predetermined time limit has elapsed during the scanning procedure. The coil traversed during the first scanning mode is wider than the coil traversed during the second scanning mode.

8 Claims, 8 Drawing Sheets

Fig. 2a

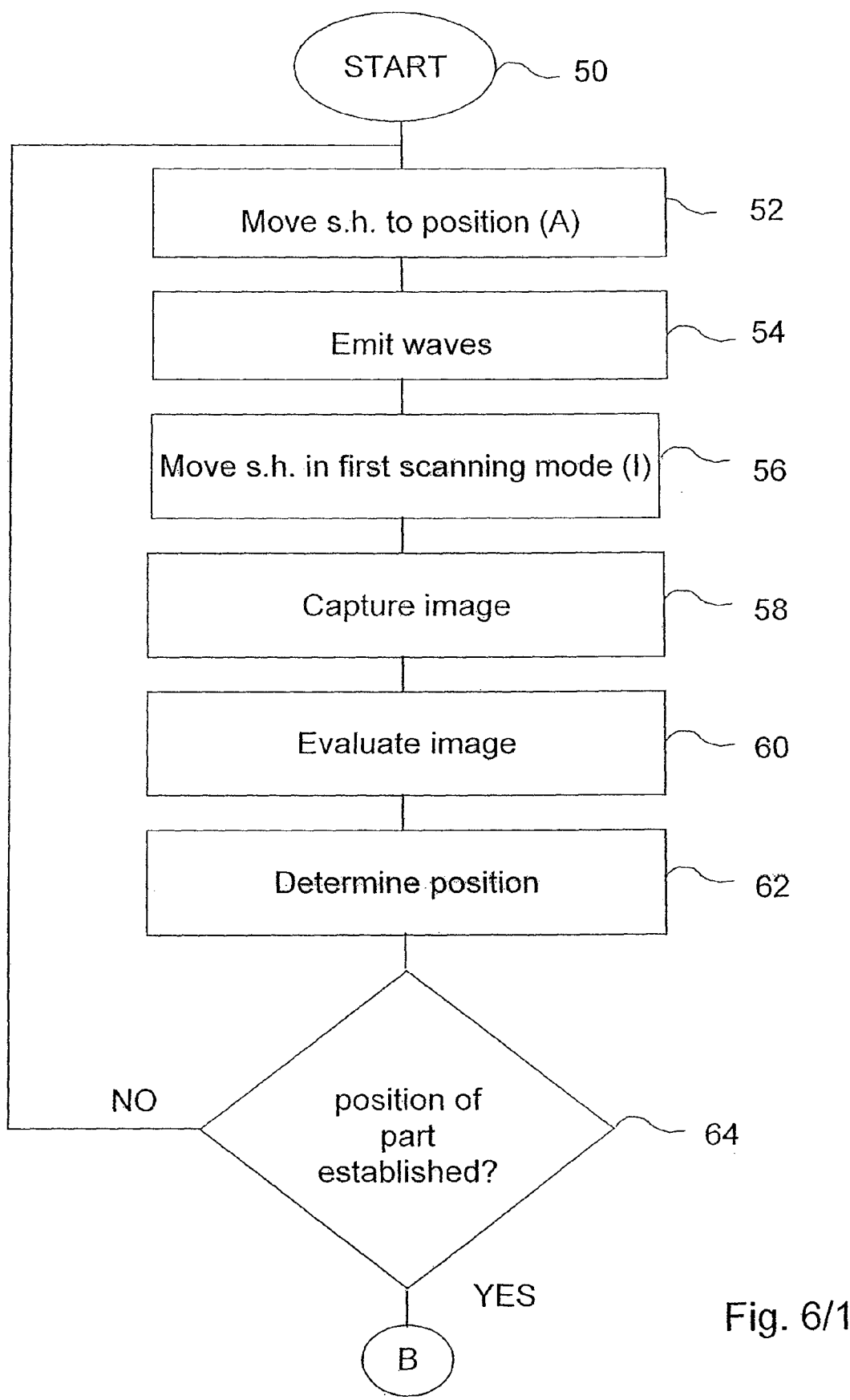
Fig. 6/1

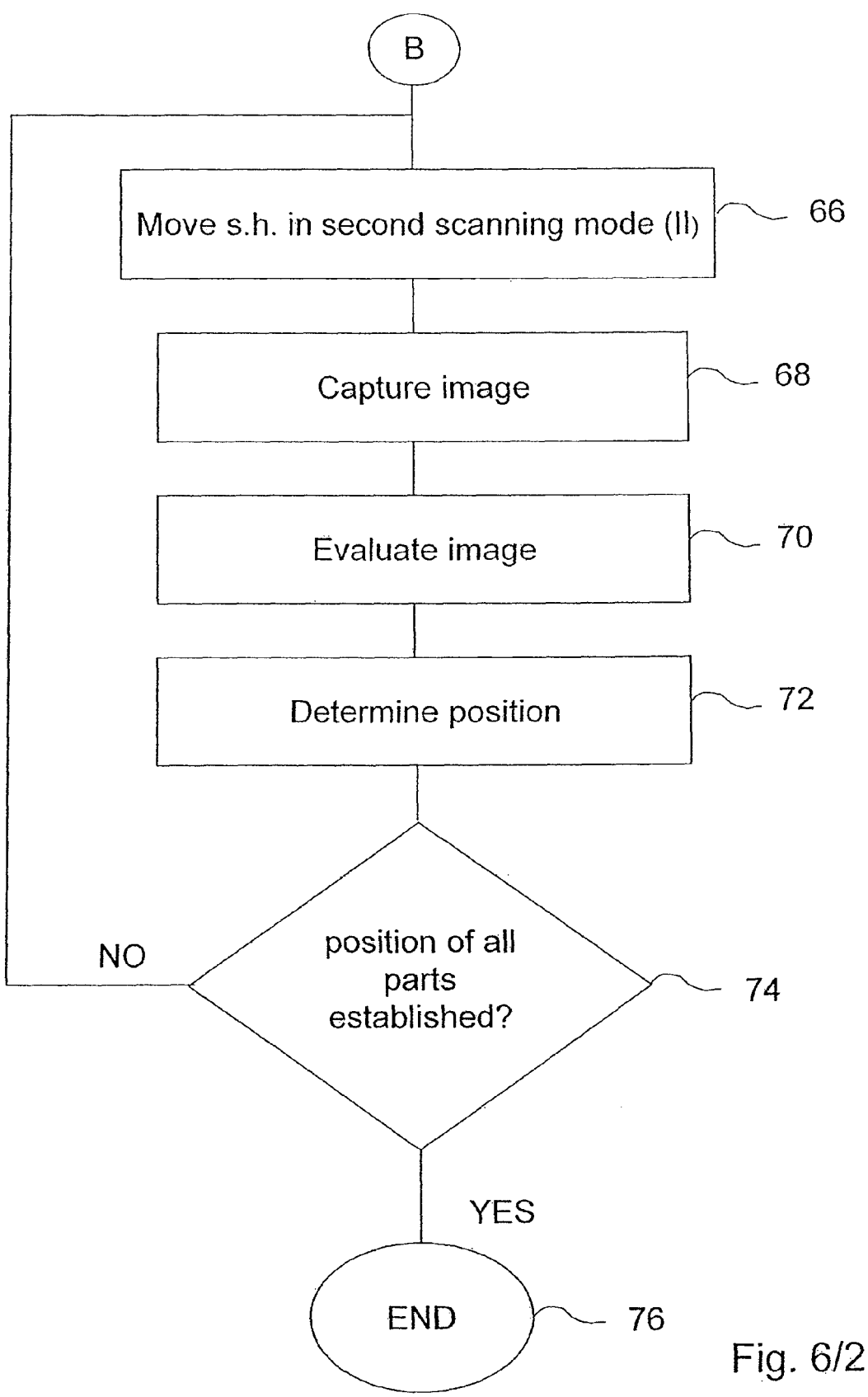
Fig. 6/2

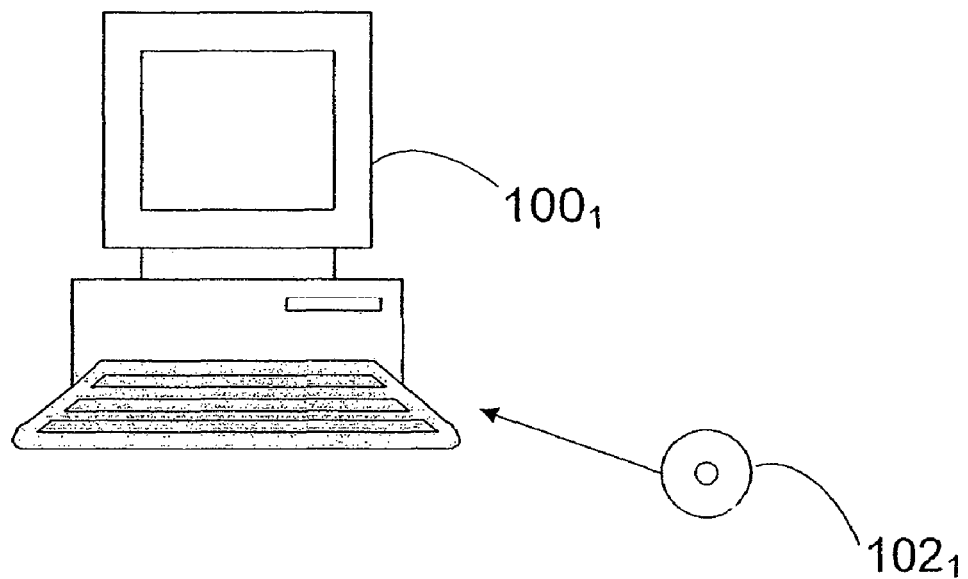
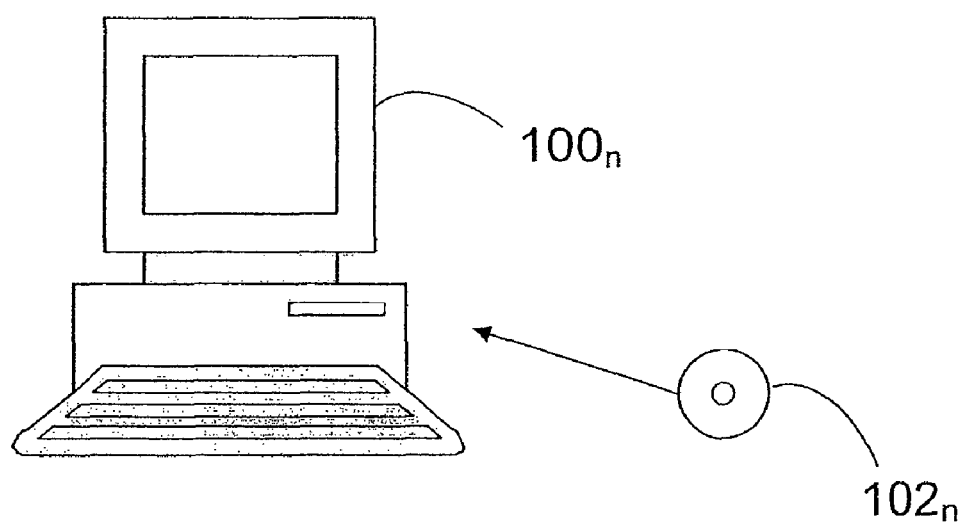
Fig. 8

APPARATUS AND METHOD FOR RECOGNIZING AND DETERMINING A POSITION

This is a Divisional of copending application Ser. No. 11/826,198, filed Jul. 12, 2007, which claims priority to Sweden Application No. 0601556-4 filed Jul. 13, 2006.

RELATED APPLICATION DATA

This application is based on and claims priority under 37 U.S.C. §119 to Swedish Application No. 0601556-4, filed Jul. 13, 2006, the entire contents of which are incorporated herein by reference.

FIELD OF THE INVENTION

The present invention relates, in a first aspect, to an apparatus for recognizing and determining the position of at least one part of an animal or of equipment in an animal box.

According to a second aspect, the present invention relates to an apparatus for recognizing and determining the position of at least one teat cup of a is teat cup magazine.

According to a third aspect, the present invention relates to a method for recognizing and determining the position of at least one part of an animal or of equipment in an animal box.

According to a fourth aspect, the present invention relates to a method for recognizing and determining the position of at least one teat cup of a teat cup magazine.

According to a fifth aspect, the present invention relates to at least one computer program product for recognizing and determining the position of at least one part of an animal or of equipment in an animal box.

According to a sixth aspect, the present invention relates to at least one computer program product for recognizing and determining the position of at least one teat cup of a teat cup magazine.

BACKGROUND OF THE INVENTION

The patent document EP-B1-0 975 211 relates to a teat location technique for automatic milking procedures. The basis for this technique is to "virtually paint" different objects with the aid of e.g. laser beams, so that the objects are illuminated at one or several moments, giving several e.g. horizontal laser-lines on the objects. With this technique it is easy to identify the outlines of different objects. These identified outlines of an object and reference criteria defining e.g. a teat, a post of a milking stall, a straw, a leg, or a tail are used to determine if the illuminated object is a teat. Then the position of an established teat is determined.

The patent document WO-00/62602 relates to a method and apparatus for recognizing and determining a position of at least one teat of a milking animal. The method includes the steps: moving a scanning head including a light source to a region containing the teat or teats, capturing at least one image formed by said light, evaluating the image or images so as to determine if each image describes said teat or teats. The scanning head is moved to a fixed initial position in the room which is under the animal. Thereafter the scanning head is moved in determined steps (A-J) under the animal: upwards towards the animal, downwards, backwards towards the udder, upwards, downwards etc., while carrying out the scanning procedure.

The method and apparatus according to WO-00/62602 is not optimized regarding the time elapsed in performing the scanning procedure.

SUMMARY

The above mentioned problems are solved by an apparatus for recognizing and determining the position of at least one part of an animal or of equipment in an animal box. The apparatus comprises a scanning head comprising a wave emitting source for emitting waves into a region expected to contain the at least one part. Furthermore, the apparatus also comprises a means operable to capture at least one image formed by said waves. The apparatus also comprises a means operable to evaluate the image or images so as to determine if each image describes the at least one part. Furthermore, the apparatus also comprises a means operable to determine the position of the at least one part if it is established that the at least one part is/are described by the image or images. The scanning head is arranged to be moved to an initial position in the room, which position is well below and in front of the at least one part of the animal, or the at least one part of the equipment in the animal box. Moreover, the scanning head is arranged to be moved in a first scanning mode (I), wherein the scanning head simultaneously performs two movements, a first movement characterized by a linear movement upwards in a first direction towards the at least one part of the animal, or the at least one part of the equipment in the animal box, and a second movement in a first plane, perpendicular in relation to the first direction, describing a geometrically closed pattern, whereby the scanning head circumscribes a first volume (V1), while carrying out the scanning procedure. (See e.g. FIGS. 2a, 3 and 4). The apparatus also comprises a means operable to compare images obtained during the first scanning mode (I) with corresponding images obtained in previous moments during the first scanning mode (I) until the position of the at least one part has been established, or a predetermined time limit has elapsed during the scanning procedure. A first main advantage with the apparatus according to the present invention is that it is "self learning", i.e. it is not dependent on so called historical data about the animals, e.g. where the teats are positioned on the udder at a previous milking session. A further advantage in this context is achieved if said scanning head is arranged to be moved in a second scanning mode (II), wherein said scanning head simultaneously performs two movements, a first movement characterized by a linear movement upwards in a first direction towards said at least one part, of said animal or said at least one part of said equipment in said animal box, and a second movement in a first plane, perpendicular in relation to said first direction, describing a geometrically closed pattern, whereby said scanning head circumscribes a second volume (v2), while carrying out the scanning procedure wherein said second volume (v2) is smaller than said first volume (v1), wherein said means are arranged for comparing images obtained during said second scanning mode (II) with corresponding images obtained in previous moments during second scanning mode (II) until the position of at least a second part has been established, or a predetermined time limit has elapsed during the scanning procedure.

Furthermore, it is an advantage in this context if that a start position for said scanning head in said second scanning mode (II) is determined in dependence of the result of said first scanning mode (I).

A further advantage in this context is achieved if said scanning head is arranged to be moved in said first scanning mode (I) and said second scanning mode (II) as many times as necessary until the positions of all parts have been established.

Furthermore, it is an advantage in this context if said at least one part is/are a teat/teats of said animal and in that said scanning head is moved in said first scanning mode (I) until the positions of the front teats have been established.

A further advantage in this context is achieved if, following said first scanning mode (I), said scanning head is moved in said second scanning mode (II) in order to establish the positions of the rear teats.

Furthermore, it is an advantage in this context if said geometrically closed pattern is essentially in the form of a circle, or is essentially in the form of an ellipse, or is essentially in the form of a rectangle.

A further advantage in this context is achieved if said scanning head during said second movement, in both said first scanning mode (I) and said second scanning mode (II) describes geometrically closed patterns of similar types.

According to another embodiment, it is an advantage if during said second movement, in both said first scanning mode (I) and said second scanning mode (II), describes geometrically closed patterns of different types.

Furthermore, it is an advantage in this context if said initial position (A) is a fixed initial position (A).

A further advantage in this context is achieved if said apparatus also comprises a sensor operable to sense the position of said animal, which position of said animal is used in determining said initial position (A).

Furthermore, it is an advantage in this context if said sensor senses said position of said animal continuously, and in that said scanning procedure is adapted to said sensed position.

A further advantage in this context is achieved if said apparatus also comprises a memory means operable to store said obtained position values and relate them to said investigated milking animal or equipment in said animal box.

Furthermore, it is an advantage in this context if said memory means also is operable to update said position values during subsequent scanning procedures.

A further advantage in this context is achieved if said scanning head is arranged to be moved in a third scanning mode (III), wherein said scanning head is moved in dependence of said position values obtained from said first scanning mode (I) and/or said second scanning mode (II). Advantageously, the teat cups are guided during said third scanning mode, which preferably is a faster scanning mode than mode 1 and mode 2. The teat cups are guided to said teats during said third scanning mode.

Furthermore, it is an advantage in this context if said wave emitting source is a light source operable to emit light.

A further advantage in this context is achieved if said scanning head is operable to direct a bundle of light.

Furthermore, it is an advantage in this context if said bundle of light is directed substantially horizontally.

A further advantage in this context is achieved if said light source is a laser source.

According to another embodiment, it is an advantage if said wave emitting source is an ultrasonic source operable to emit ultrasonic sound.

Furthermore, it is an advantage in this context if said apparatus also comprises a stop sensor operable to stop said scanning procedure when said scanning head has reached a predetermined height, or reached an obstacle.

The invention also refers to an apparatus for recognizing and determining the position of at least one teat cup of a teat cup magazine. The apparatus comprises a scanning head comprising a wave emitting source for emitting waves into a region which is expected to contain the at least one teat cup. Furthermore, the apparatus also comprises a means operable to capture at least one image formed by the waves. Furthermore, the apparatus also comprises a means operable to evaluate the image or images so as to determine if each image describes the at least one teat cup. The apparatus also comprises a means operable to determine the position of the at least one teat cup it is established that the teat cup or teat cups is/are described by the image or images. The scanning head is arranged to be moved to an initial position in the room, which position is well below and in front of the teat cup magazine. Moreover, the scanning head is arranged to be moved in a predetermined pattern while carrying out the scanning procedure. The apparatus also comprises a means operable to compare images obtained during the scanning procedure with corresponding images obtained in previous moments during the scanning procedure until the position of the at least one teat cup has been established, or a predetermined time limit has elapsed during the scanning procedure.

An advantage with this apparatus according to the present invention is that it is an automatic way of learning the positions of the teat cups.

A further advantage in this context is achieved if said scanning head is arranged to be moved in a first scanning mode (I), wherein said scanning head simultaneously performs two movements, a first movement characterized by a linear movement upwards in a first direction towards said teat cup magazine, and a second movement in a first plane, perpendicular in relation to said first direction, describing a geometrically closed pattern, whereby said scanning head circumscribes a first volume (V1), while carrying out the scanning procedure, wherein said means are arranged for comparing images obtained during said first scanning mode (I) with corresponding images obtained in previous moments during said first scanning mode (I) until the position of said at least one teat cup has been established, or a predetermined time limit has elapsed during the scanning procedure.

Furthermore, it is an advantage in this context if said scanning head is arranged to be moved in a second scanning mode (II), wherein said scanning head simultaneously performs two movements, a first movement characterized by a linear movement upwards in a first direction towards said teat cup magazine, and a second movement in a first plane, perpendicular in relation to said first direction, describing a geometrically closed pattern, whereby said scanning head circumscribes a second volume (V2), while carrying out the scanning procedure, wherein said second volume (V2) is smaller than said first volume (V1), wherein said means are arranged for comparing images obtained during said second scanning mode (II) with corresponding images obtained in previous moments during said second scanning mode (II) until the position of at least a second teat cup has been established, or a predetermined time limit has elapsed during the scanning procedure.

The invention also refers to a method for recognizing and determining the position of at least one part of an animal, or of equipment in an animal box.

The invention also refers to a method for recognizing and determining the position of at least one teat cup of a teat cup magazine.

The above mentioned problems can also be solved by at least one computer program product. The at least one computer program product is/are directly loadable into the internal memory of at least one digital computer. The at least one computer program product comprises software code portions for performing the steps of the methods according to the present invention, when the at least one product is/are run on at least one computer.

A first main advantage with the at least one computer program product according to the present invention is that it/they is/are "self learning", i.e. it/they is/are not dependent on so called historical data about the animal, i.e. where the teats are positioned on the udder at a previously milking session.

An advantage with the at least one computer program product, when performing the steps according to the present invention is that it/they is/are an to automatic way of learning the positions of the teat cups.

It will be noted that the term "comprises/comprising" as used in this description is intended to denote the presence of a given characteristic, step or component, without excluding the presence of one or more other characteristic features, integers, steps, components or groups thereof.

Embodiments of the invention will now be described with a reference to the accompanying drawings, in which:

BRIEF DESCRIPTION OF THE DRAWINGS

FIG. 5a shows teat representations in the form of discrete captured image lines, whereas

FIG. 6 is a flow chart of the method for recognizing and determining the position of at least one part of an animal or of equipment in an animal box according to the present invention; FIG. 8 schematically shows a number of computer program products according to the present invention.

DETAILED DESCRIPTION OF THE PREFERRED EMBODIMENTS

Figure 1:
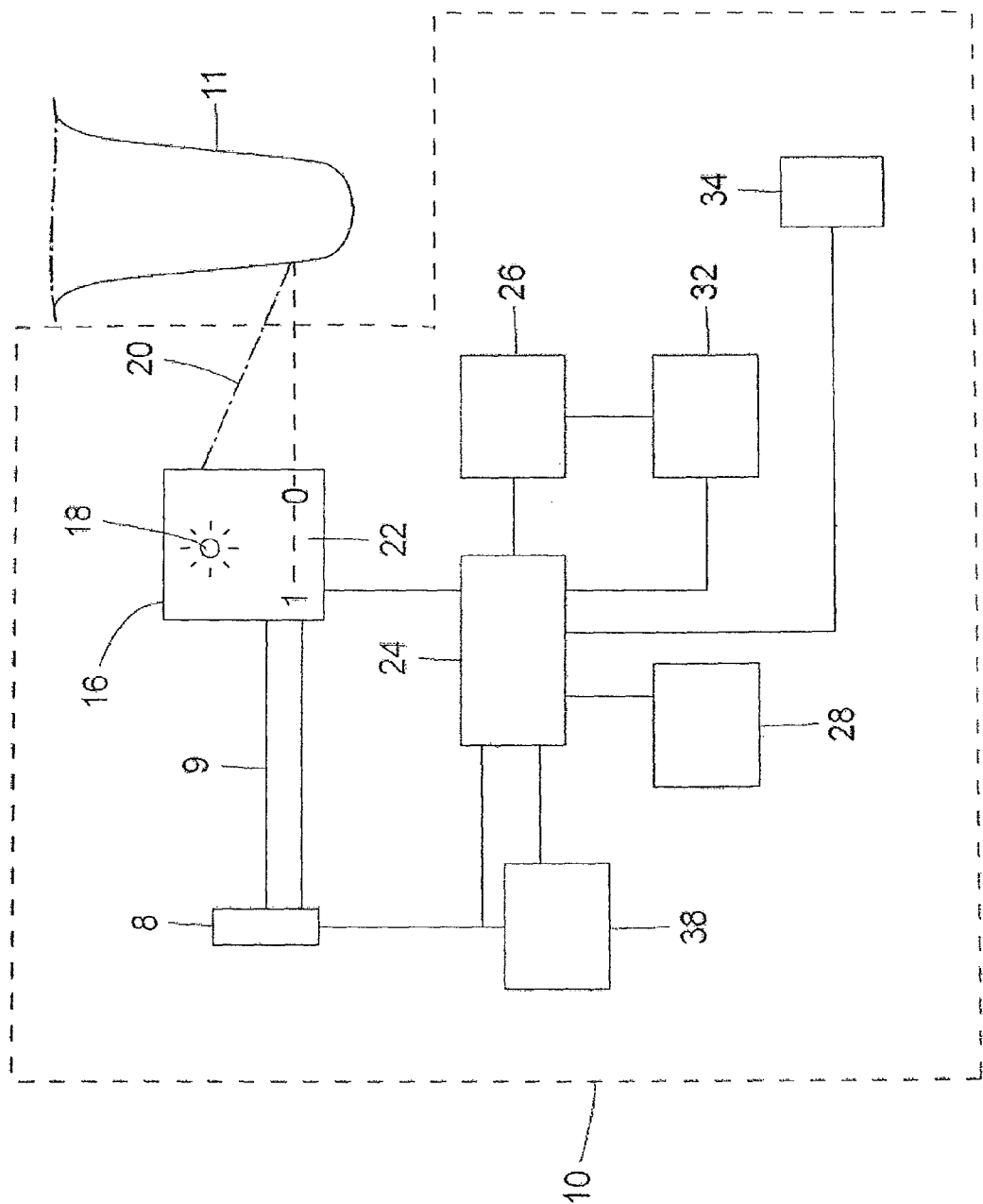
FIG. 1 shows a block diagram of an apparatus for recognizing and determining the position of at least one teat of a milking animal according to the present invention.

In FIG. 1 there is disclosed a block diagram of an apparatus 10 for recognizing and determining the position of at least one part 11, 12, 13, 15, 17 (see FIGS. 2a, 2b, 5a and 5b) of an animal 14 (see FIGS. 2a and 2b) or of equipment in an animal box according to the present invention. In this example the part 11, 12, 13, 15, 17 is a teat 11, 12 of an animal 14. As is apparent in FIG. 1, the apparatus 10 comprises a scanning head 16 comprising a light source 18, such as a laser source 18, being arranged to emit a sheet shaped bundle of light 20 into a region is which is expected to contain a teat or teats 11. For the sake of simplicity, only one teat 11 is disclosed in FIG. 1. The bundle of light 20 is directed substantially horizontally. Inside the scanning head 16 there is also provided a means 22 operable to capture at least one image formed by the light 20. The means 22 is e.g. an image-capturing camera 22, for example a charge coupled device camera 22 (CCD-camera) or a CMOS-camera. The apparatus 10 also comprises a means 24 operable to evaluate the image or images so as to determine if each image describes the teat or teats 11. As is apparent in FIG. 1, the means 24 is connected to the scanning head 16, and functions as a control unit, which also is adapted to control the operation of the light source 18 and the camera 22.

Furthermore, the apparatus 10 also comprises a to the means 24 connected means 26 operable to determine the position of the teat or teats 11, if it is established that the teat or teats 11 is/are described by the image or images. As is apparent in FIG. 1, the apparatus 10 also comprises a means 28 connected to the means/control unit 24, which means 28 is operable to provide signal information for guiding a teat cup to the position.

It is pointed out, that the scanning head 16, in its most general form, comprises a wave emitting source 18 for emitting waves 20, and in that the means 22 is operable to capture at least one image formed by the waves 20.

In another embodiment of the apparatus 10, the wave emitting source 18 is an ultrasonic source 18 operable to emit ultrasonic sound.

It is pointed out that the term image as it is used in this description can be provided by only one pixel or a number of pixels. An image formed by waves can relate for example to intensity, colour, or phase deviation of reflections of said waves.

The scanning head 16 is arranged to be moved to an initial position A (see FIG. 2a) in the room, which position A is well below the animal 14 (see FIG. 2a) and clearly in front of an udder 30 (see FIG. 2b) and thereby the teats 11 of the milking animal 14. Thereafter, the scanning head 16 is arranged to be moved in a first scanning mode (I), wherein the scanning head 16 simultaneously performs two movements. A first movement characterized by a linear movement upwards in a first direction (arrow B in FIG. 2a) towards the animal 14, and a second movement in a first plane, perpendicular in relation to the first direction B, describing a geometrically closed pattern, whereby the scanning head 16 circumscribes a first volume (V1) (see FIG. 2a), while carrying out the scanning procedure. The apparatus 10 also comprises a means 32 operable to compare images obtained during the first scanning mode (I) with corresponding images obtained in previous moments during the first scanning mode (I) until the position of at least a first teat 11 has been established, or a predetermined time limit has elapsed during the scanning procedure. As is apparent in FIG. 1, the comparing means 32 is connected to the evaluation means/control unit 24 and the position determining means 26.

Thereafter, the scanning head 16 can be arranged to be moved in a second scanning mode (II), wherein the scanning head 16 simultaneously performs two movements. A first movement characterized by a linear movement upwards in a first direction (arrow B' in FIG. 2b) towards the animal 14, and a second movement in a first plane, perpendicular in relation to the first direction B', describing a geometrically closed pattern, whereby the scanning head 16 circumscribes a second volume (V2) (see FIG. 2b), while carrying out the scanning procedure. It is pointed out that the second volume (V2) is smaller than the first volume (V1). Thereafter, the comparing means 32 is operable to compare images obtained during the second scanning mode (II) with corresponding images obtained in previous moments during the second scanning mode (II) until the position of at least a second teat 11, 12 has been established, or a predetermined time limit has elapsed during the scanning procedure. The predetermined time limit can e.g. be 3 minutes.

As is apparent in FIG. 1, the apparatus 10 also comprises a sensor 34 operable to sense the position of the animal 14, which position is used in determining the initial position A. The sensor 34 is connected to the evaluation means/control unit 24. In the embodiment disclosed in FIG. 2a, the sensor 34 is located on a rear plate 36. The sensor 34 can e.g. be a potentiometer, a number of pressure sensors arranged in the floor of the animal box, or a camera. Furthermore, the apparatus 10 also comprises a memory means 38 connected to the evaluation means/control unit 24, and operable to store the obtained position values and relate them to the investigated milking animal 14. The memory means 38 is also operable to update the position values during subsequent scanning procedures.

According to a preferred embodiment of the apparatus 10, the sensor 34 senses the position of the animal 14 continuously, and the scanning procedure is adapted to the sensed position.

Further, as is apparent in FIG. 1, the evaluation means/control unit 24 controls the movement of the scanning head 16 by transmitting signals to a drive mechanism 8, which is arranged to move a robot arm 9, which in turn carries the scanning head 16.

Furthermore, the apparatus 10 can be arranged to stop the scanning procedure when the scanning head 16 has reached a predetermined height, or reached an obstacle. The apparatus 10 can also be arranged to stop the scanning procedure when the scanning head 16 touches the animal 14, by the use of a sensor on the scanning head 16 itself, or a sensor related to the robot arm 9, or to the drive mechanism 8.

According to a preferred embodiment of the apparatus 10, the scanning head 16 is moved in the first scanning mode (I), until the position of the front teats 11 have been established. Thereafter, the scanning head 16 is moved in the second scanning mode (II) in order to establish the positions of the rear teats 12.

According to a preferred embodiment of the apparatus 10, a start position for the scanning head 16 in the second scanning mode (II) is determined in dependence of the result of the first scanning mode (I).

In another preferred embodiment of the apparatus 10, the scanning head 16 is arranged to be moved in the first scanning mode (I) and the second scanning mode (II) as many times as necessary until the positions of all parts 11, 12, 13, 15, 17 have been established.

The apparatus 10 according to the present invention can also be used for automatic animal positioning. When performing the above described scanning procedure, the apparatus 10 can also learn the appropriate position of the food trough 44 (see FIG. 2a), by moving the food trough 44 and use the sensor 34 to sense when the animal 14 touches the rear plate 36 in order to get the animal position within the desired limits. The iteration has to be very slowly in order for the animal to be able to move between the movements of the food trough 44.

Figure 2A:
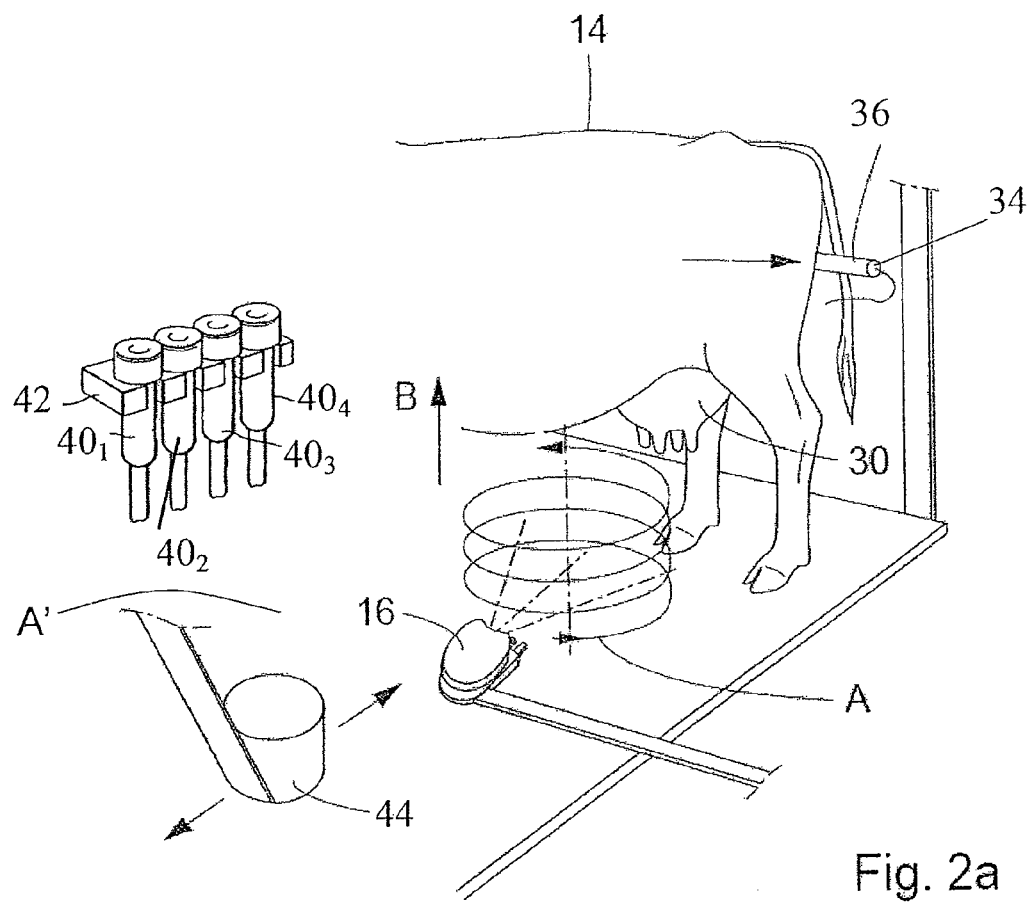
FIGS. 2a and 2b diagramatically shows the movement of the scanning head, under a cow, in a first embodiment of the apparatus according to the present invention.
Figure 2B:
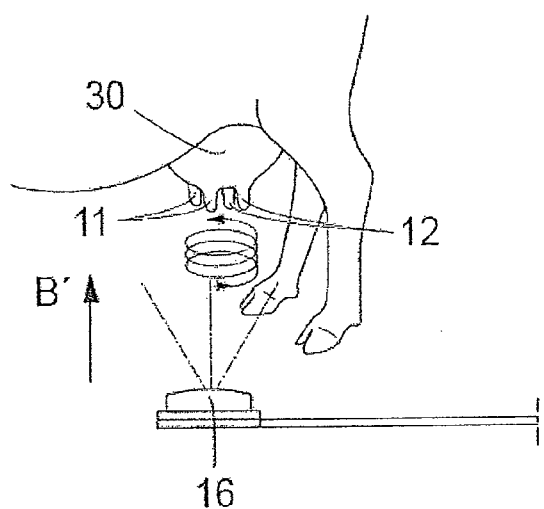

FIGS. 2a and 2b diagrammatically shows the movement of the scanning head 16, under a cow 14, in a first embodiment of the apparatus 10 according to the present invention. In FIG. 2a, the scanning head 16 is moved in the first is scanning mode (I), and in FIG. 2b, the scanning head 16 is moved in the second scanning mode (II).

In FIG. 2a, the scanning head 16 starts the first scanning mode (I) from the initial position A. In this case the scanning head 16 performs two movements simultaneously. A first linear movement upwards in a first direction (arrow B) towards the cow 14. The scanning head 16 also performs a second movement in a first plane, perpendicular in relation to the first direction B, describing a circle, resulting in a total movement formed like a coil. Due to the fact that it is the start the scanning procedure, the scanning head 16 is moved in a rather wide coil in order to find something that can be a teat 11. Another way of characterizing the movements of the scanning head 16 is to say that the scanning head 16 circumscribes a first volume (V1). The first scanning mode (I) can e.g. be used until the positions of the front teats 11 have been established.

In FIG. 2b the scanning head 16 is moved in the scanning mode (II), wherein said scanning head 16 simultaneously performs two movements, in a similar way as in the first scanning mode (I). In this second scanning mode (II), the scanning head 16 is moved in a movement formed like a coil, but in this case the coil is not so wide as the coil in the first scanning mode (I) (see FIG. 2a). The scanning head 16 circumscribes a second volume (V2), wherein the second volume (V2) is smaller than the first volume (V1). This second scanning mode (II) can e.g. be used in order to establish the positions of the back teats 12.

Figure 3:
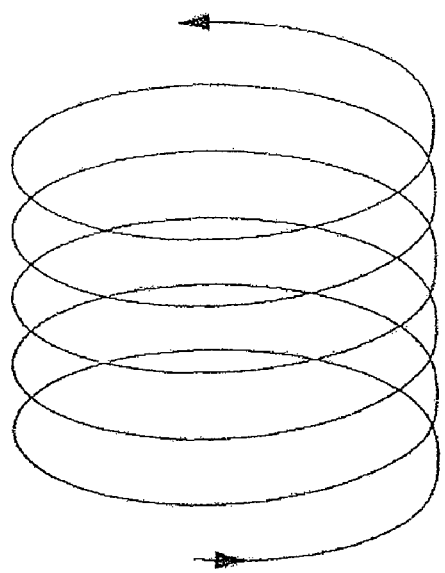
FIG. 3 diagramatically shows the movement of the scanning head in a second embodiment of the apparatus according to the present invention.

FIG. 3 diagramatically shows the movement of the scanning head 16 in a second embodiment of the apparatus 10 according to the present invention. In this embodiment, the second movement in the first plane, describes an ellipse, in contrast to the embodiment disclosed in e.g. FIG. 2a, wherein the second movement describes a circle. As is apparent in FIG. 3, the total movement of the scanning head 16 is formed like an elliptical coil.

Figure 4:
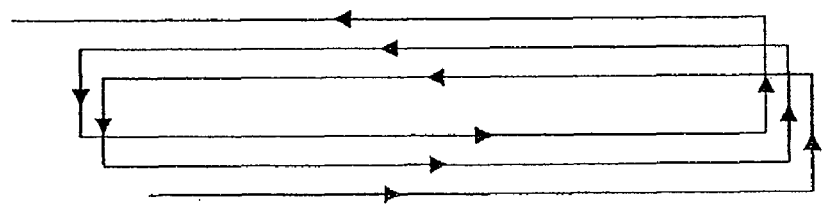
FIG. 4 diagramatically shows the movement of the scanning head in a third embodiment of the apparatus according to the present invention.

FIG. 4 diagramatically shows the movement of the scanning head 16 in a third embodiment of the apparatus 10 according to the present invention. In this embodiment, the second movement in the first plane, describes a rectangle, in contrast to the embodiment disclosed in e.g. FIG. 2a, wherein the second movement describes a circle. As is apparent in FIG. 4, the total movement of the scanning head 16 is formed like a rectangular coil.

According to one embodiment of the apparatus 10, during the second movement, in both the first scanning mode (I) and the second scanning mode (II), the scanning head 16 describes geometrically closed patterns of similar types, e.g. a circle as in FIGS. 2a and 2b.

According to another embodiment of the apparatus 10, during the second movement, in both the first scanning mode (I) and the second scanning mode (II), the scanning head 16 describes geometrically closed pattern of different types, e.g. an ellipse in FIG. 3 and a rectangle in FIG. 4.

According to a further preferred embodiment of the apparatus 10, the scanning head 16 is arranged to be moved in a third scanning mode (III), wherein the scanning head 16 is moved in dependence of the position values obtained from the first scanning mode (I) and/or the second scanning mode (II). Advantageously, the teat cups are guided during said third scanning mode, which preferably is a faster scanning mode than mode 1 and mode 2. The teat cups are guided to said teats during said third scanning mode.

Figure 5A:
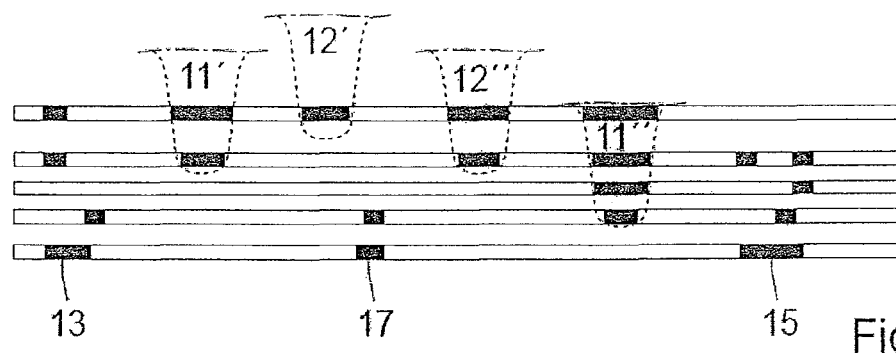
Figure 5B:
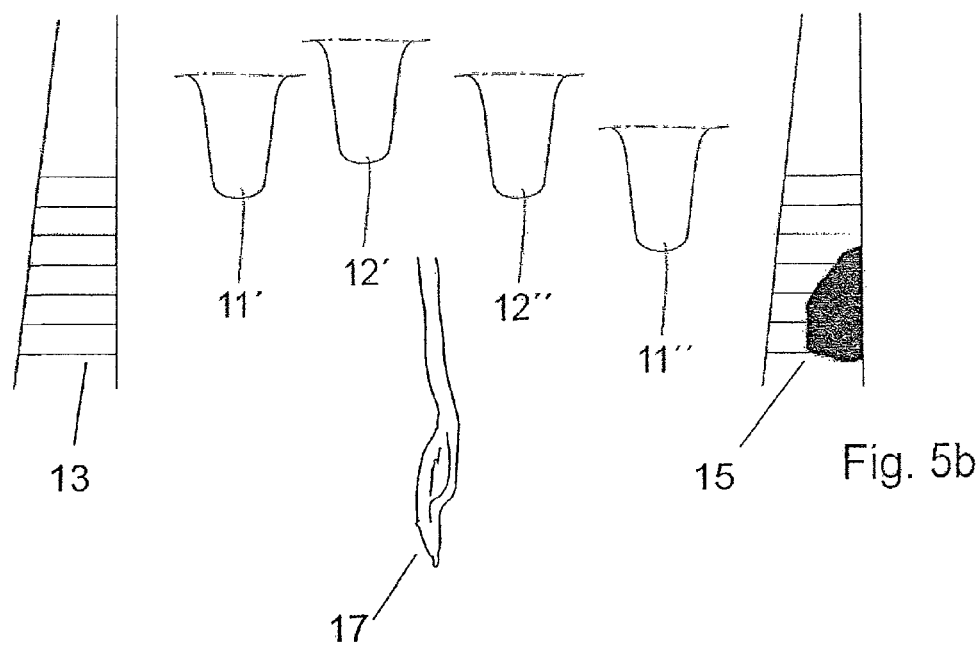
FIG. 5b shows the underlying "true" image.

FIG. 5a shows teat representations in the form of discrete captured image lines, whereas FIG. 5b shows the underlying "true" image.

FIG. 5a shows the captured teats in the form of discrete captured image lines. More specifically, this figure comprises five images obtained during the scanning procedure. By comparing images and the stored information, the apparatus 10 is capable of determining that the (here black) image lines included inside the teat images (indicated with dotted lines 11', 11", 12', 12") are indeed describing teats having lower extreme points, whereas lines 13 and 15 relate to legs without such lower extreme points and 17 to the tail. The reference signs for the front teats are 11', 11", and the reference signs for the back teats are 12', 12" in FIGS. 5a and 5b. Compare with FIG. 5b, which shows the "real image" behind FIG. 5a.

According to another aspect of the present invention, the apparatus 10 disclosed in FIG. 1 can be used for recognizing and determining the position of at least one teat cup $40_1$, $40_2$, $40_3$, $40_4$ (see FIG. 2a) of a teat cup magazine 42. The apparatus 10 comprises a scanning head 16 comprising a wave emitting source 18 operable to emit waves 20 into a region which is expected to contain the at least one teat cup $40_1$, $40_2$, $40_3$, $40_4$. The apparatus 10 also comprises a means 22 operable to capture at least one image formed by said waves 20. Furthermore, the apparatus 10 also comprises a means 24 operable to evaluate the image/images so as to determine if each image describes the at least one teat cup $40_1$, $40_2$, $40_3$, $40_4$. The apparatus 10 also comprises a means 26 operable to determine the position of the at least one teat cup $40_1$, $40_2$, $40_3$, $40_4$ if it is established that the teat cup/cups $40_1$, $40_2$, $40_3$, $40_4$ is/are described by the image/images. The scanning head 16 is arranged to be moved to an initial position (A') in the room, which position (A') is well below and in front of the teat cup magazine 42 (see FIG. 2a). Thereafter, the scanning head 16 is arranged to be moved in a predetermined pattern while carrying out the scanning procedure. The apparatus 10 also comprises a means 32 operable to compare images obtained during the scanning procedure with corresponding images obtained in previous moments during the scanning procedure until the position of the at least one teat cup $40_1$, $40_2$, $40_3$, $40_4$ has been established, or a predetermined time limit has elapsed during the scanning procedure.

According to a preferred embodiment of the apparatus 10, the scanning head 16 is arranged to be moved in a first scanning mode (I), wherein the scanning head 16 simultaneously performs two movements. A first movement characterized by a linear movement upwards in a first direction towards the teat cup magazine 42. A second movement in a first plane, perpendicular in relation to the first direction, describing a geometrically closed pattern, whereby the scanning head 16 circumscribes a first volume (V1), while carrying out the scanning procedure. The means 32 is operable to compare images obtained during the first scanning mode (I) with corresponding images obtained in previous movements during the first scanning mode (I) until the position of the at least one teat cup $40_1$, $40_2$, $40_3$, $40_4$ has been established, or a predetermined time limit has elapsed during the scanning procedure.

According to another preferred embodiment of the apparatus 10, the scanning head 16 is arranged to be moved in a second scanning mode (II), wherein the scanning head 16 simultaneously performs two movements. A first movement characterized by a linear movement upwards in a first direction towards the teat cup magazine 42. A second movement in a first plane, perpendicular in relation to the first direction, describing a geometrically closed pattern, whereby the scanning head circumscribes a second volume (V2) while carrying out the scanning procedure. The second volume (V2) is smaller than the first volume (V1). The means 32 is operable to compare images obtained during the second scanning mode (II) with corresponding images obtained in previous movements during the second scanning mode (II) until the position of at least a second teat cup $40_1$, $40_2$, $40_3$, $40_4$ has been established, or a predetermined time limit has elapsed during the scanning procedure.

In FIG. 6 there is disclosed a flow chart of the method for recognizing and determining the position of at least one part 11, 12, 13, 15, 17 of an animal 14, or of equipment in an animal box, according to the present invention. The method begins at block 50. Thereafter, the method continues, at block 52, with the step; to move a scanning head 16 comprising wave emitting source 18 to a region (A) containing the at least one part 11, 12, 13, 15, 17 The method continues, at block 54, with the step: to emit waves 20 from the wave emitting source 18 into the region (A) so as to direct the waves 20 towards the at least one part 11, 12, 13, 15, 17. Thereafter, the method continues, at block 56, with the step: to move the scanning head 16 in a first scanning mode (I), wherein the scanning head 16 simultaneously performs two movements, a first movement characterized by a linear movement upwards in first direction towards the at least one part 11, 12, 13, 15, 17 of the animal 14, or of the equipment in the animal box, and a second movement in a first plane, perpendicular in relation to the first direction, describing a geometrically closed pattern, whereby the scanning head 16 circumscribes a first volume (V1), while carrying out the scanning procedure. The method continues, at block 58, with the step: to capture at least one image formed by the waves 20. Thereafter, the method continues, at block 60, with the step: to evaluate the image or images so as to determine if each image describes the at least one part 11, 12, 13, 15, 17. The method continues, at block 62, with the step: in the event that it is established that the at least one part 11, 12, 13, 15, 17 is/are described by the image or images, to determine the position of the at least one part 11, 12, 13, 15, 17. It is understood that the blocks 58-62 may be iterated. Thereafter, the method continues, at block 64, with the step: to ask the question if the position of at least a first part 11, 12, 13, 15, 17 has been established? If the answer is negative (NO), then the steps according to the blocks 52-64 are performed once again If at this moment, a stop limit has been reached, such as detection of an obstacle, such as an animal part 14, or if a predetermined time limit has elapsed during the scanning procedure, then the steps 52-64 are performed once again. If on the other hand, the answer is affirmative, then the method continues, at block 66, with the step: to move the scanning head 16 in a second scanning mode (II), wherein the scanning head 16 simultaneously performs two movements, a first movement characterized by a linear movement upwards in a first direction towards the at least one part 11, 12, 13, 15, 17 of the animal 14, or of the equipment in the animal box, and a second movement in a first plane, perpendicular in relation to the first direction, describing a geometrically closed pattern, whereby the scanning head 16 circumscribes a second volume (V2), while carrying out the scanning procedure. The second volume (V2) is smaller than the first volume (V1). Thereafter, the method continues, at block 68, with the step: to capture at least one image formed by the waves 20. The method continues, at block 70, with the step: to evaluate the image or images so as to determine if each images describes the at least one part 11, 12, 13, 15, 17. Thereafter, the method continues, at block 72 with the step: in the event that it is established that the at least one part 11, 12, 13, 15, 17 is/are described by the image or images, to determine the position of the at least one part 11, 12, 13, 15, 17. The method continues, at block 74, with the step: to ask the question if the positions of all teats 11, 12 have been established? or if a predetermined time limit has elapsed during the scanning procedure? If the answer is negative (NO), then the steps according to the blocks 66-74 are performed once again. If, on the other hand, the answer is affirmative, then the method is completed at block 76.

According to one preferred embodiment of the method, it also comprises the step:
    to determine a start position for the scanning head 16 in the second scanning mode (II) in dependence of the result of the first scanning mode (I).

According to another preferred embodiment of the method, it also comprises the step:
    to move the scanning head 16 in the first scanning mode (I) and the second scanning mode (II) as many times as necessary until the positions of all parts 11, 12, 13, 15, 17 have been established.

According to one preferred embodiment of the method if the at least one part is/are a teat/teats of the animal 14, the scanning head 16 is moved in the first scanning mode (I) until the positions of the front teats 11 have been established. Thereafter, the scanning head 16 is moved in the second scanning mode (II) in order to establish the positions of the rear teats 12.

In another embodiment of the method, the geometrically closed pattern is essentially in the form of a circle. (See FIGS. 2a and 2b).

In yet another embodiment of the method, the geometrically closed pattern is essentially in the form of an ellipse. (See FIG. 3).

In another embodiment of the method, the geometrically closed pattern is essentially in the form of a rectangle. (See FIG. 4).

In a first embodiment of the method, the scanning head 16 during the second movement, in both the first scanning mode (I) and the second scanning mode (II), describes geometrically closed patterns of similar types, e.g. circles.

In another embodiment of the method, the scanning head 16 during the second movement, in both the first scanning mode (I) and the second scanning mode (II), describes geometrically closed patterns of different types e.g. a circle and an ellipse.

In another embodiment of the method, the initial position (A) is a fixed initial position (A).

In a preferred embodiment of the method, it also comprises the step: to sense the position of the animal 14, which position of the animal 14 is used in determining the initial position (A).

In another preferred embodiment of the method, the sensing step comprises the step to sense the position of the animal 14 continuously, and to adapt the scanning procedure to the sensed position.

In another embodiment of the method, it also comprises the step: to store the obtained position values and to relate them to the investigated animal 14, or equipment in the animal box.

In yet another embodiment of the method, it also comprises the step: to update the position values during subsequent scanning procedures.

According to another preferred embodiment of the method, it also comprises the step: to move the scanning head 16 in a third scanning mode (III), wherein the scanning head 16 is moved in dependence of the position values obtained from the first scanning mode (I) and/or the second scanning mode (II). Advantageously, the teat cups are guided during said third scanning mode, which preferably is a faster scanning mode than mode 1 and mode 2. The teat cups are guided to said teats during said third scanning mode.

According to another preferred embodiment of the method, the wave emitting source 18 is a light source 18 operable to emit light 20.

According to yet another preferred embodiment of the method, the scanning head 16 is operable to direct a bundle of light 20.

Figure 7:
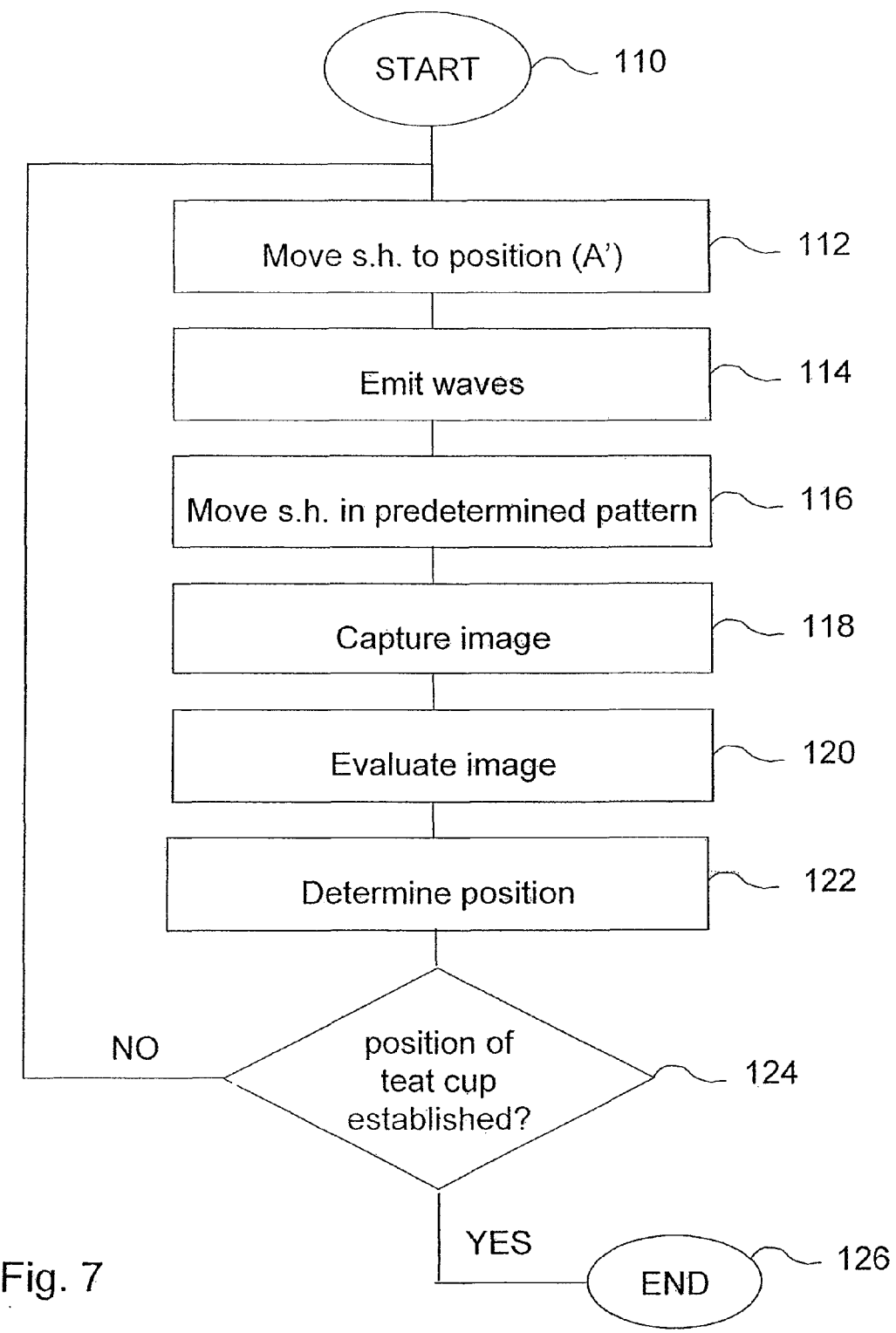
FIG. 7 is a flow chart of the method for recognizing and determining the position of at least one teat cup of a teat cup magazine according to the present invention.

In FIG. 7 there is disclosed a flow chart of a method for recognizing and determining the position of at least one teat cup $40_1, 40_2, 40_3, 40_4$ of a teat cup magazine 42 according to the present invention. The method begins at block 110. Thereafter, the method continues, at block 112, with the step: to move a scanning head 16 comprising a wave emitting source 18 to an initial position (A') in the room, which position (A') is well below and in front of the teat cup magazine 42. The method continues, at block 114, with the step: to emit waves 20 from the wave emitting source 18 into the region (A) so as to direct the waves 20 towards the at least one teat cup $40_1, 40_2, 40_3, 40_4$. Thereafter, the method continues, at block 116, with the step: to move the scanning head 16 in a predetermined pattern while carrying out the scanning procedure. The method continues, at block 118, with the step: to capture at least one image formed by the waves 20. Thereafter, the method continues, at block 120, with the step: to evaluate the image/images so as to determine if each image describes the at least one teat cup $40_1, 40_2, 40_3, 40_4$. The method continues, at block 122, with the step: in the event that it is established that the at least one teat cup $40_1, 40_2, 40_3, 40_4$ is/are described by the image/images, to determine the position of the at least one teat cup $40_1, 40_2, 40_3, 40_4$. It is understood that the blocks 118-122 may be iterated. Thereafter, the method continues, at block 124, with the step: to ask the question if the position of the at least one teat cup $40_1, 40_2, 40_3, 40_4$ has been established? If the answer is negative (NO) then the steps according to the blocks 112-124 are performed once again. If on other hand, the answer is affirmative, then the method is completed, at block 126.

In a preferred embodiment of the method, it also comprises the step: to move the scanning head 16 in a first scanning mode (I), wherein the scanning head 16 simultaneously performs two movements. A first movement characterized by a linear movement upwards in a first direction towards the teat cup magazine 42. A second movement in a first plane, perpendicular in relation to the first direction, describing a geometrically closed pattern, whereby the scanning head circumscribes a first volume (V1), while carrying out the scanning procedure. The evaluating step comprises to compare images obtained during the first scanning mode (I) with corresponding images obtained in previous moments during the first scanning mode (I) until the position of the at least one teat cups $40_1, 40_2, 40_3, 40_4$ has been established, or a predetermined time limit has elapsed during the scanning procedure.

In another preferred embodiment of the method, it also comprises the step: to move the scanning head 16 in a second scanning mode (II), wherein the scanning head 16 simultaneously performs two movements. A first movement characterized by a linear movement upwards in a first direction towards the teat cup magazine 42. A second movement in a first plane, perpendicular in relation to the first direction, describing a geometrically closed pattern, whereby the scanning head 16 circumscribes a second volume (V2), while carrying out the scanning procedure. The second volume (V2) is smaller the first volume (V1). The evaluating step comprises to compare images obtained during the second scanning mode (II) with corresponding images obtained in previous moments during the second scanning mode (II) until the position of at least a second teat cup $40_1, 40_2, 40_3, 40_4$ has been established, or a predetermined time limit has elapsed during the scanning procedure.

Other examples of equipment in an animal box are after and prior treatment devices, such as a spray device for spraying of the udder and the teats, e.g. for cleaning of these, or a cup which is filled with iodine in which the teats are dipped after finished milking.

It is pointed out that the position can be determined with the aid of so called triangulation.

In FIG. 8, some computer program products $102_1, \ldots, 102_n$ according to the present invention are schematically shown. In FIG. 8, n different digital computers $100_1, \ldots, 100_n$ are shown, where n is an integer. In FIG. 8, n different computer program products $102_1, \ldots, 102_n$ are shown, here shown in different form of CD discs. The different computer program products $102_1, \ldots, 102_n$ are directly loadable into the internal memory of the n different computers $100_1, \ldots, 100_n$. Each computer program product $102_1, \ldots, 102_n$ comprises software code portions for executing a part or all the steps according to FIG. 6, claim 27 or FIG. 7, claim 50 when the product/products $102_1, \ldots, 102_n$ is/are run on the computers $100_1, \ldots, 100_n$. The computer program products $102_1, \ldots, 102_n$ may, for instance, be in the form of diskettes, RAM discs, magnetic tapes, magneto-optical discs or some other suitable products.

The invention is not limited to the described embodiments. It will be evident for those skilled in the art that many different modifications are feasible within the scope of the following Claims.

The invention claimed is:

1. An apparatus for recognizing and determining a position of at least one teat cup of a teat cup magazine, comprising:
 a scanning head comprising a wave emitting source for emitting waves into a region which is expected to contain said at least one teat cup;
 a means operable to capture at least one image formed by said waves,
 a means operable to evaluate said at least one image so as to determine if said at least one image describes said at least one teat cup; and
 means operable to determine the position of said at least one teat cup if it is established that said at least one teat cup is described by said at least one image, wherein
 said scanning head is arranged to be moved to an initial position in a room, which said initial position is below and in front of said teat cup magazine;
 said scanning head is arranged to be moved in a coil like movement while carrying out a scanning procedure, wherein means are arranged for comparing images obtained during said scanning procedure with corresponding images obtained in previous moments during said scanning procedure until the position of said at least one teat cup has been established, or a predetermined time limit has elapsed during the scanning procedure.

2. The apparatus according to claim 1, wherein said scanning head is arranged to be moved in a first scanning mode, wherein said scanning head simultaneously performs two movements, a first movement characterized by a linear movement upwards in a first direction towards said teat cup magazine, and a second movement in a first plane, perpendicular in relation to said first direction, describing a geometrically closed pattern, whereby said scanning head circumscribes a first volume, while carrying out the scanning procedure, wherein said means are arranged for comparing images obtained during said first scanning mode with corresponding images obtained in previous moments during said first scanning mode until the position of said at least one teat cup has been established, or a predetermined time limit has elapsed during the scanning procedure.

3. The apparatus according to claim 2, wherein said scanning head is arranged to be moved in a second scanning mode, wherein said scanning head simultaneously performs another two movements, a first movement characterized by a linear movement upwards in a first direction towards said teat cup magazine, and a second movement in a first plane, perpendicular in relation to said first direction, describing a second geometrically closed pattern, whereby said scanning head circumscribes a second volume, while carrying out the scanning procedure, wherein said second volume is smaller than said first volume, wherein said means are arranged for comparing images obtained during said second scanning mode with corresponding images obtained in previous moments during said second scanning mode until the position of at least a second teat cup has been established, or a predetermined time limit has elapsed during the scanning procedure.

4. A method for recognizing and determining a position of at least one teat cup of a teat cup magazine, which method comprises the step of:
 moving a scanning head comprising a wave emitting source to a region containing said at least one teat cup;
 emitting waves from said wave emitting source into said region so as to direct said waves towards said at least one teat cup;
 capturing at least one image formed by said waves;
 evaluating said at least one image so as to determine if each said at least one image describes said at least one teat cup; and
 in the event that it is established that said at least one teat cup is described by said at least one image, determining the position of said at least one teat cup, wherein said method also comprises the steps:
 moving said scanning head to an initial position in a room, which said initial position is below and in front of said teat cup magazine;
 moving said scanning head in a coil like movement while carrying out a scanning procedure,
 wherein said evaluating step comprises comparing images obtained during said scanning procedure with corresponding images obtained in previous moments during said scanning procedure until the position of said at least one teat cup has been established, or a predetermined time limit has elapsed during the scanning procedure.

5. The method according to claim 4, wherein said method also comprises the step:
 moving said scanning head in a first scanning mode, wherein said scanning head simultaneously performs two movements, a first movement characterized by a linear movement upwards in a first direction towards said teat cup magazine, and a second movement in a first plane, perpendicular in relation to said first direction, describing a geometrically closed pattern, whereby said scanning head circumscribes a first volume, while carrying out the scanning procedure, said evaluating step comprising comparing images obtained during said first scanning mode with corresponding images obtained in previous moments during said first scanning mode until the position of said at least one teat cup has been established, or a predetermined time limit has elapsed during the scanning procedure.

6. The method according to claim 5, wherein said method also comprises:
 moving said scanning head in a second scanning mode, wherein said scanning head simultaneously performs another two movements, a first movement characterized by a linear movement upwards in a first direction towards said teat cup magazine, and a second movement in a first plane, perpendicular in relation to said first direction, describing a second geometrically closed pattern, whereby said scanning head circumscribes a second volume, while carrying out the scanning procedure, wherein said second volume is smaller than said first volume, wherein said evaluating step comprises comparing images obtained during said second scanning mode with corresponding images obtained in previous moments during said second scanning mode until the position of at least a second teat cup has been established, or a predetermined time limit has elapsed during the scanning procedure.

7. At least one non-transitory computer readable medium comprising software code portions, that when executed by at least one digital computer, causes said at least one digital computer to perform the steps of claim 4.

8. At least one non-transitory computer readable medium comprising software code portions, that when executed by at least one digital computer, causes said at least one digital computer to perform the steps of claim 5.

* * * * *